United States Patent [19]
Chen

[11] Patent Number: 5,522,449
[45] Date of Patent: Jun. 4, 1996

[54] GRIPPING MEANS OF AN INJECTION MOLDING MACHINE

[76] Inventor: Ming-shan Chen, No. 41, Lane 332, Chienkuo Rd., Pingtung, Taiwan

[21] Appl. No.: 446,445

[22] Filed: May 22, 1995

[51] Int. Cl.$^6$ .......................... B22D 33/04; B22D 17/26; B22D 33/04
[52] U.S. Cl. .......................... 114/341; 164/342; 164/137
[58] Field of Search .......................... 164/341, 342, 164/137

[56] References Cited

FOREIGN PATENT DOCUMENTS 9000467  1/1990  WIPO .......................... 164/341

Primary Examiner—Jack W. Lavinder
Assistant Examiner—I.-H. Lin

Attorney, Agent, or Firm—Welsh & Katz, Ltd.

[57] ABSTRACT

A gripping device of an injection molding machine, the gripping device rotatably disposed to a front side of a plate which is connected to a mold, the gripping device including a rotatable device, a first jaw and a second jaw, the first and the second jaws are slidably engaged to the board and the board having a first gear disposed thereto, a shaft extending through the board, the first gear and the plate wherein the shaft is fixed at both its ends and has a threaded portion defined in a peripheral surface thereof to threadedly engage with the first jaw and the second jaw, a second motor disposed to the plate and having a second gear mechanically engaged thereto, the second gear engaged to the first gear such that the board and the first gear are rotated by the second motor, the movable plate and the gripping device are therefore moved along the shaft so as be to securely engaged to another fixed mold.

3 Claims, 7 Drawing Sheets

GRIPPING MEANS OF AN INJECTION MOLDING MACHINE

BACKGROUND OF THE INVENTION

The present invention relates to a gripping means and more particularly, to a gripping means of an injection machine, which provides a sufficient force to securely grip the molds when injecting material into the molds.

Conventionally, the injection molding machine comprises two molds between which the molding material is injected to form a product having a configuration in accordance with the inner shape of the two molds. The two molds are respectively disposed to a movable plate and a fixed base, the mold disposed to the movable plate is moved toward the other mold disposed to the fixed base by a long stroke cylinder, a gripping means mechanically connected to the movable plate is then actuated to provide a force to move the mold disposed to the movable plate to contact the mold disposed to the fixed base in order to securely engage the two molds together when injecting molding material into a space enclosed by the two molds. The molding material is injected into the molds by a high pressure injecting means and therefore a very large force exerts against the respective inner surface of the two molds and has a tendency to push the two molds apart. In this situation, the two molds could be slightly separated from each other and the gripping means could be damaged and furthermore, the product formed between the two molds looses a pre-determined configuration thereof because some material is formed between a slit defined between the two molds.. In order to improve the drawback, the gripping means must equipped with a cylinder with larger diameter so as to provide a sufficient force to resist against the outward force of the molds by the action of injecting material into the molds, however, there are at least four rods extending through the movable plate such that the movable plate can move along the four rods, therefore, the space between the four rods restricts the using of the cylinder with larger diameter and thus a sufficient force to maintain a secure engagement of the two molds is difficult to be achieved. Preferably, the force ratio received between the cylinder outputs and the molds is larger than 2 which ensures a secure engagement between the two molds and the conventional gripping means mentioned above usually achieves the standard only by increasing the size of the injection molding machine which incurs a high cost.

The present invention intends to provide a gripping means of an injection molding machine and which provides a sufficient force to secure the two molds together and therefore mitigates and/or obviates the above-mentioned problems.

SUMMARY OF THE INVENTION

The present invention provides a gripping means of an injection molding machine, the gripping means rotatably disposed to a front side of a plate which is connected to a mold, the gripping means including a rotatable means, a first jaw and a second jaw, each of the first and the second jaws slidably engaged to a board of the rotatable means and the board having a first gear disposed thereto, a shaft extending through the board, the first gear and the movable plate and being fixed at both its ends, the shaft having a threaded portion defined in a peripheral surface thereof for threadedly engaging with the first jaw and the second jaw, a second motor disposed to the plate and having a second gear mechanically engaged thereto, the second gear engaged to the first gear such that the board and the first gear are rotated by the second motor, the plate and the gripping means are therefore able to move along the shaft so as to securely engage to another mold.

It is an object of the present invention to provide a gripping means which provides a sufficient force to a plate to securely engage two molds.

It is another object of the present invention to provide a gripping means which occupies less space than the conventional one.

Other objects, advantages, and novel features of the invention will become more apparent from the following detailed description when taken in conjunction with the accompanying drawings.

DETAILED DESCRIPTION OF THE PREFERRED EMBODIMENTS

Figure 1:
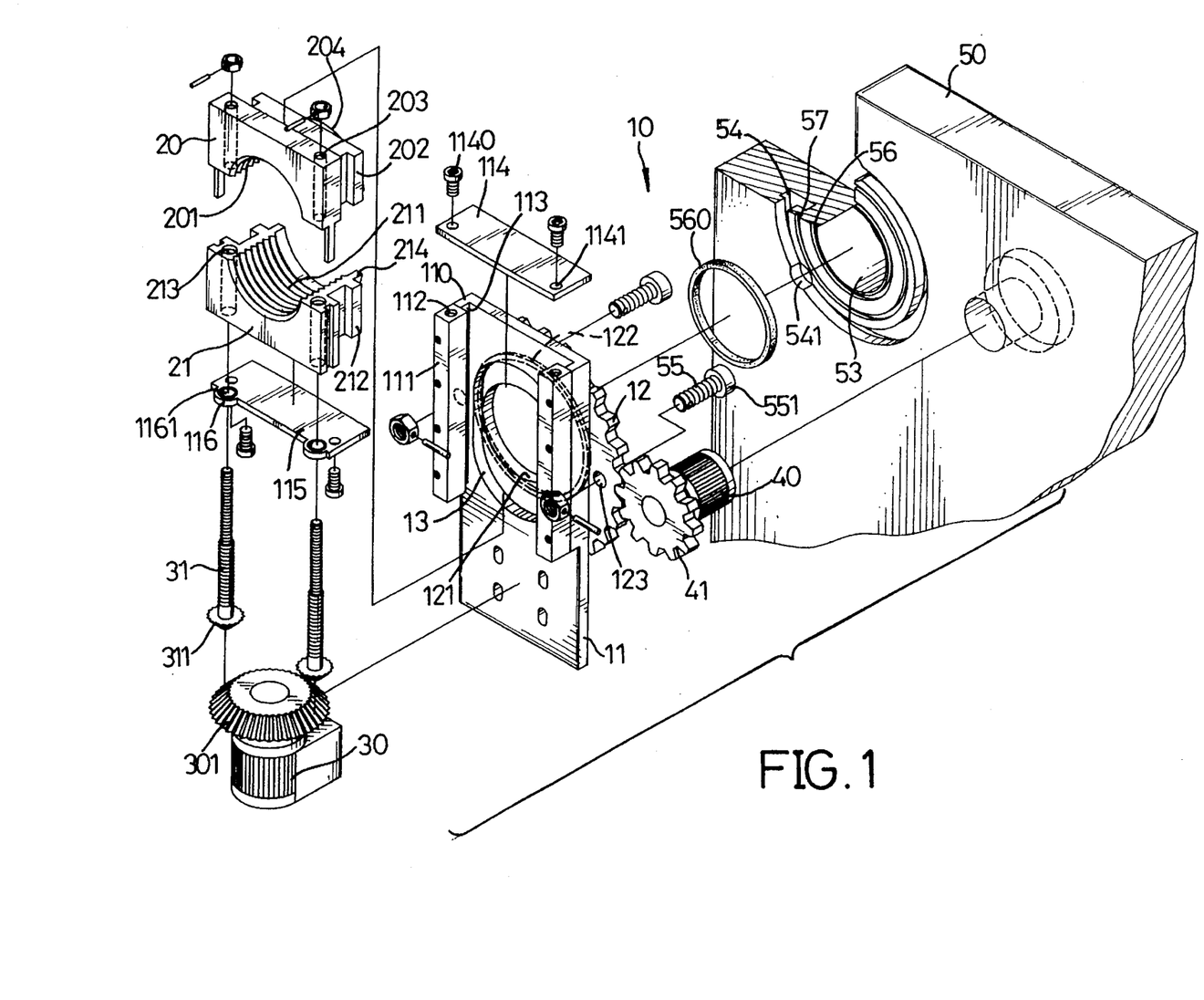
FIG. 1 is an exploded view of a gripping means and a plate in accordance with the present invention.
Figure 2:
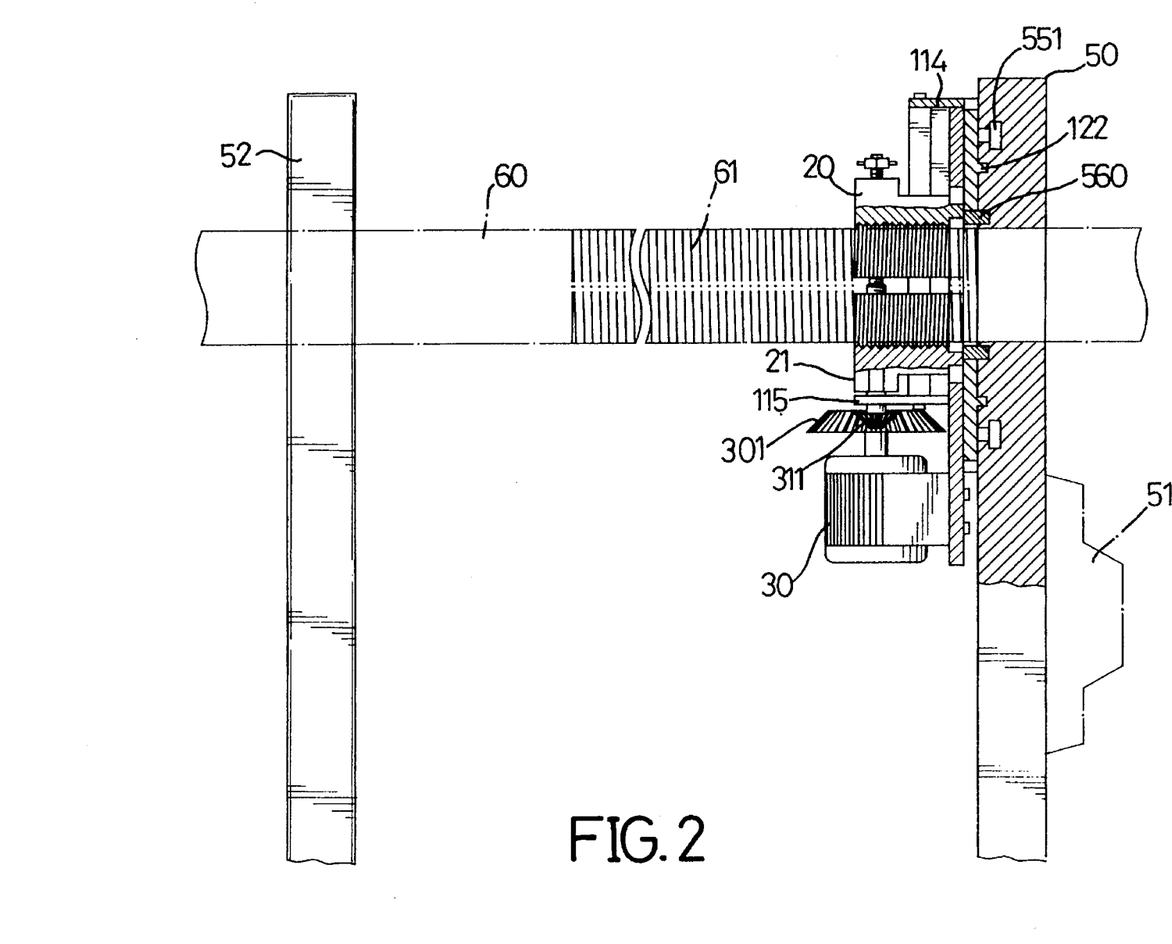
FIG. 2 is a side elevational view, partly in section, of a shaft passing through a fixed plate and a movable plate wherein a first jaw and a second jaw of the gripping means are not threadedly engaged with the shaft.

Referring to the drawings and initially to FIGS. 1 and 2, a gripping means in accordance with the present invention generally includes a rotatable means 10, a first jaw 20, a second jaw 21, a first motor 30 and a second motor 40. The rotatable means 10 is disposed to each of four corners of a front side of a movable plate 50 which has a mold 51 disposed to a rear side thereof and a shaft 60 passes through the rotatable means 10 and the movable plate 50. The shaft 60 is fixed at one end thereof to a fixed plate 52 and the other end of the shaft 60 is fixed to a base wherein the other mold is disposed (the base and the other mold are not shown). The rotatable means 10 includes a board 11 and a first gear 12, the board 11 having a front side and a rear side, the front side thereof having a wall 110 extending from each one of two opposite sides thereof and each wall 110 having a block 111 disposed to a distal surface thereof by a plurality of bolts (not shown) engaged therethrough, a threaded hole 112 is defined in both ends of the block 111 and a key way 113 is defined between the wall 110, the board 11 and the block 111. The rear side of the board 11 has the first gear 12 disposed thereto, an oval recess 13 defined in the board 11 between the two walls 110 and a hole 121 defined in the first gear 12, the hole 121 having a common axis with the oval hole 13. The first gear 12 has a circular flange 122 extending therefrom and toward the movable plate 50.

The movable plate 50 has a passage 53 defined therein and the passage 53 has an axis which coincides with the common axis of the hole 121 and the oval 13, the movable plate having a groove 54, T-shaped in cross section, defined in the front side thereof facing to the first gear 12, at least one aperture 541 defined in the movable plate 50 and communicating with the T-shaped groove 54 for a bolt 55 to extend through the aperture 541 and engaged with a first hole 123 defined in the first gear 12, a head 551 of the bolt 55 received in a section of the T-shaped groove 54. The movable plate 50 has a first loop-like groove 56 and a second loop-like groove 57 defined in the front side thereof and has an axis coinciding with the axis of the passage 53, the circular flange 122 of the first gear 12 is received in the second loop-like groove 57 and a washer 560 is received in the first loop-like groove 56 such that the first gear 12 and the board 11 can be rotated about the axis of the passage 53.

The first jaw 20 has a first semi-circular threaded portion 201 defined in an under side thereof and has a first key 202 extending laterally from each one of two opposite sides thereof to be slidably received in the key way 113 of the board 11, a first threaded hole 203 defined in each the two opposite sides of the first jaw 20. The second jaw 21 has a second semi-circular threaded portion 211 defined in an upper side thereof and has a second key 212 extending laterally from each one of two opposite sides thereof to be slidably received in the key way 113 of the board 11, a second threaded hole 213 defined in each of the two opposite sides of the second jaw 21 and in alignment with the first threaded hole 203. The first jaw 20 and the second jaw 21 respectively have a semi-circular flange 204,214 extending therefrom which are respectively received in the oval hole 13 before the blocks 111 are disposed to the walls 110 and the keys 202, 212 are received in the key ways 113 after the blocks 111 are disposed to the corresponding walls 110 and, an upper plate 114 is disposed to the upper end of the board 11 by threadedly engaging two bolts 1140 through respective holes 1141 defined therein and the respective threaded hole 112. A lower plate 115 is disposed to an under side of the board 11 in the same way as the upper plate 114 wherein two ears 116 extend from the under plate 115 and each ear 116 has a hole 1161 defined therein for a threaded rod 31 to extend through the hole 1161 and engage in the corresponding first threaded hole 203 and second threaded hole 213 in alignment with each other, each of the threaded rods 31 having an end disposed to a first bevel gear 301. The shaft 60 extending through the oval hole 13, the hole 121 and the passage 53 has a threaded portion 61 defined in a peripheral surface thereof for engagement with the first semi-circular threaded portion 201 and the second semi-circular threaded portion 211 of the first jaw 20 and the second jaw 21 respectively.

Figure 3:
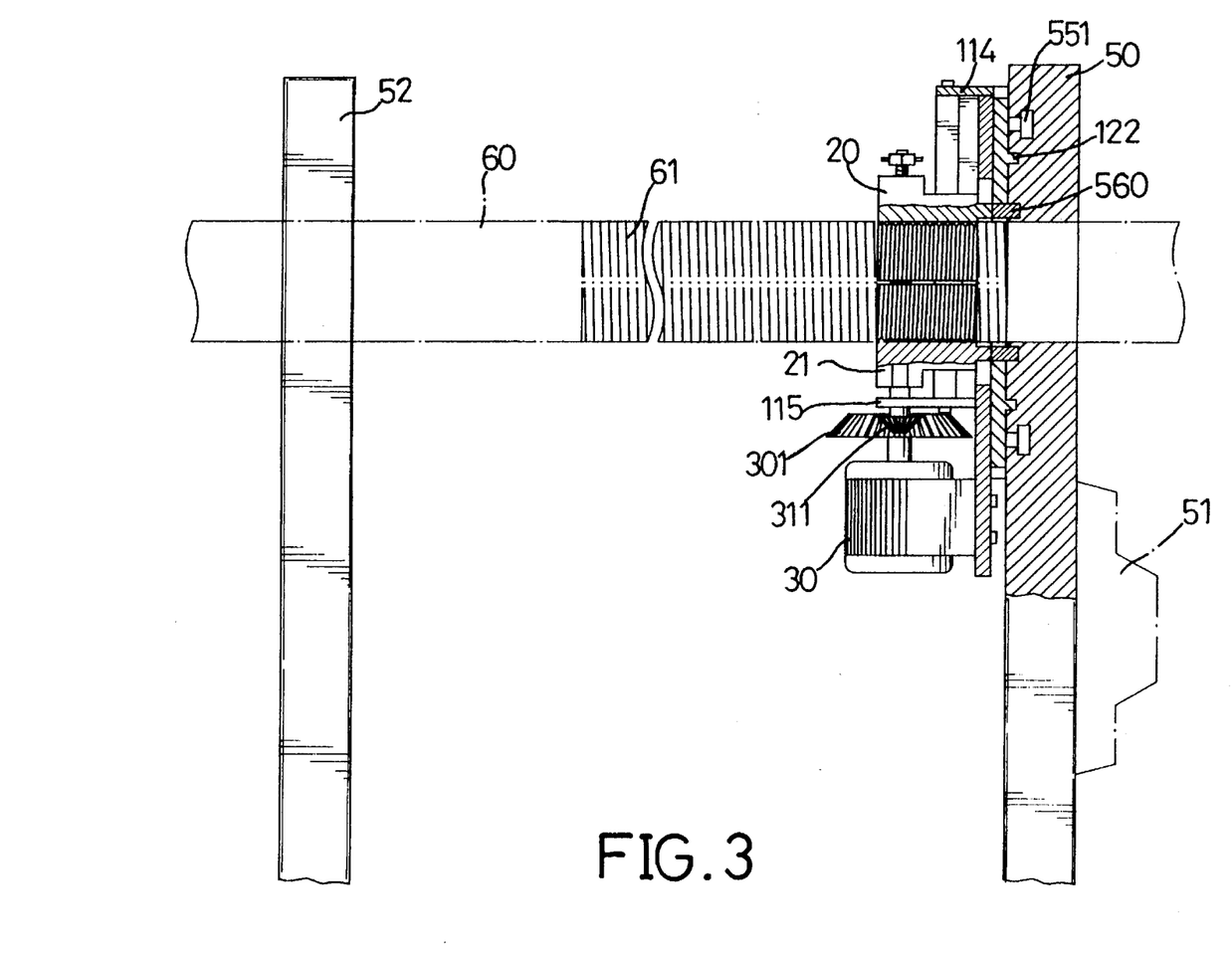
FIG. 3 is a view similar to FIG. 2 wherein the first jaw and the second jaw are threadedly engaged with the shaft.

The first motor 30 is disposed to the board 11 beneath the oval hole 13 and is mechanically connected to a first bevel gear 301 for engagement to the two tilt gears 311 such that when the first bevel gear 301 is rotated by the first motor 30 the first jaw 20 and the second jaw 21 are moved along the threaded rods 31 so as to move together to threadedly engage to the threaded portion 61 of the shaft 60 as shown in FIG. 3.

Figure 4:
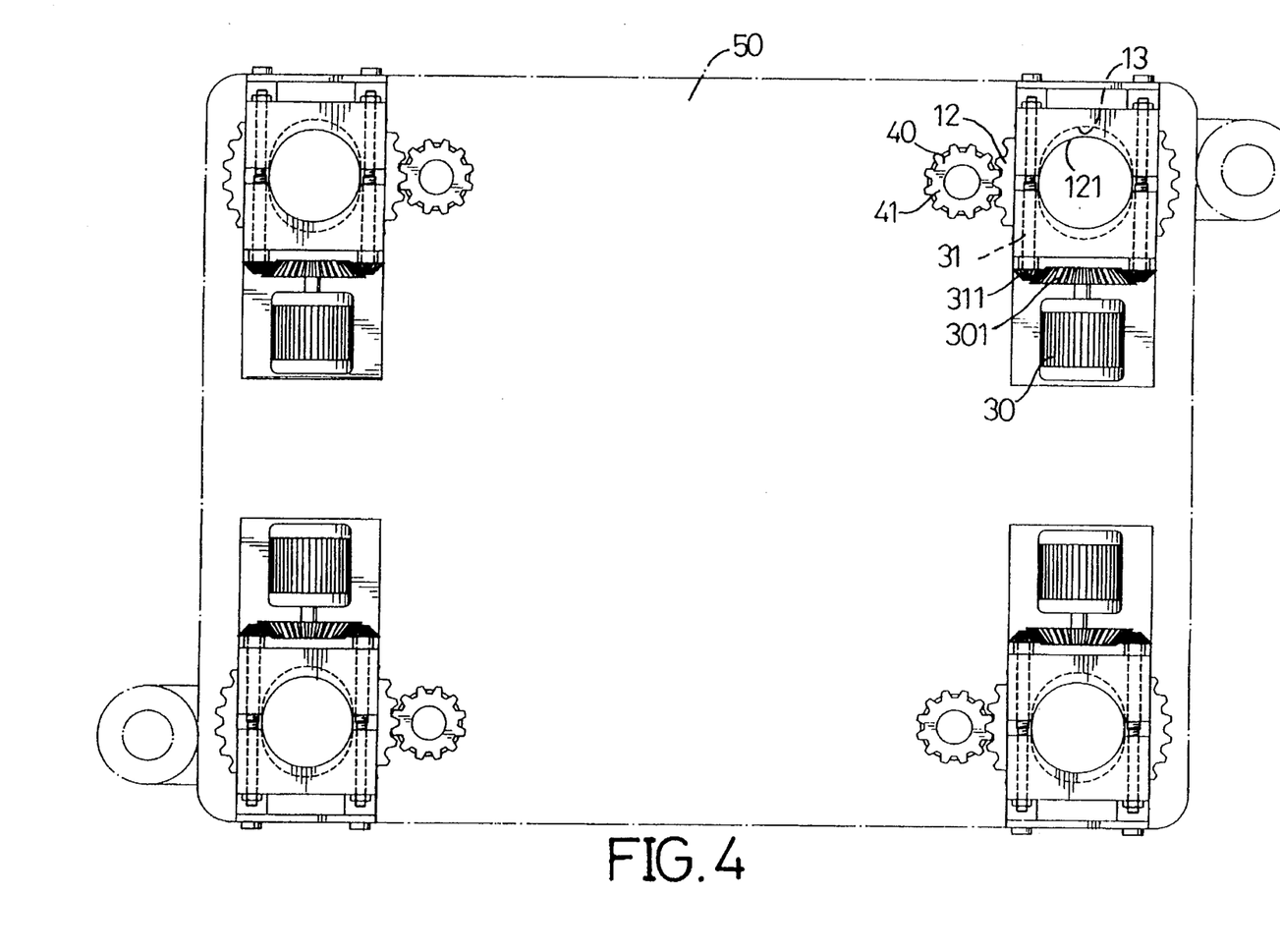
FIG. 4 is a plane view of an arrangement of the four gripping means disposed on the movable plate.
Figure 5:
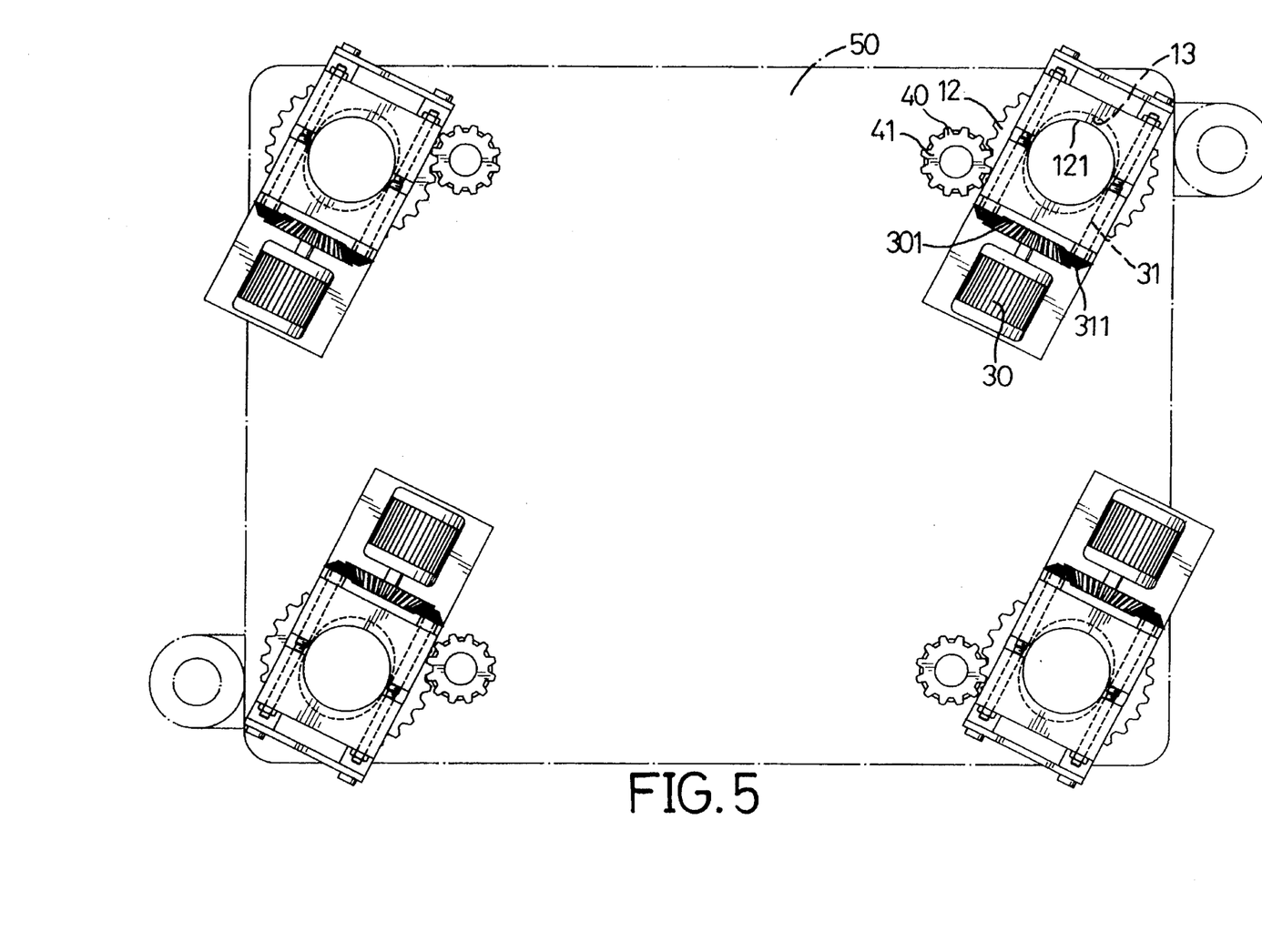
FIG. 5 is a view similar to FIG. 4 wherein the gripping means are rotated at an angle.

Further referring to FIGS. 4 and 5, the second motor 40 is disposed to the movable plate 50 and has a second gear 41 mechanically connected thereto and the second gear 41 engaged to the first gear 12 to rotate the board 11 about the axis of the passage 53 of the movable plate 50 such that when the first jaw 20 and the second jaw 21 are engaged to the threaded portion 61 of the shaft 60 and the board 11 is rotated by the second motor 40 and will move the movable plate 50 to securely contact the other mold of the fixed base (not shown).

Figure 6:
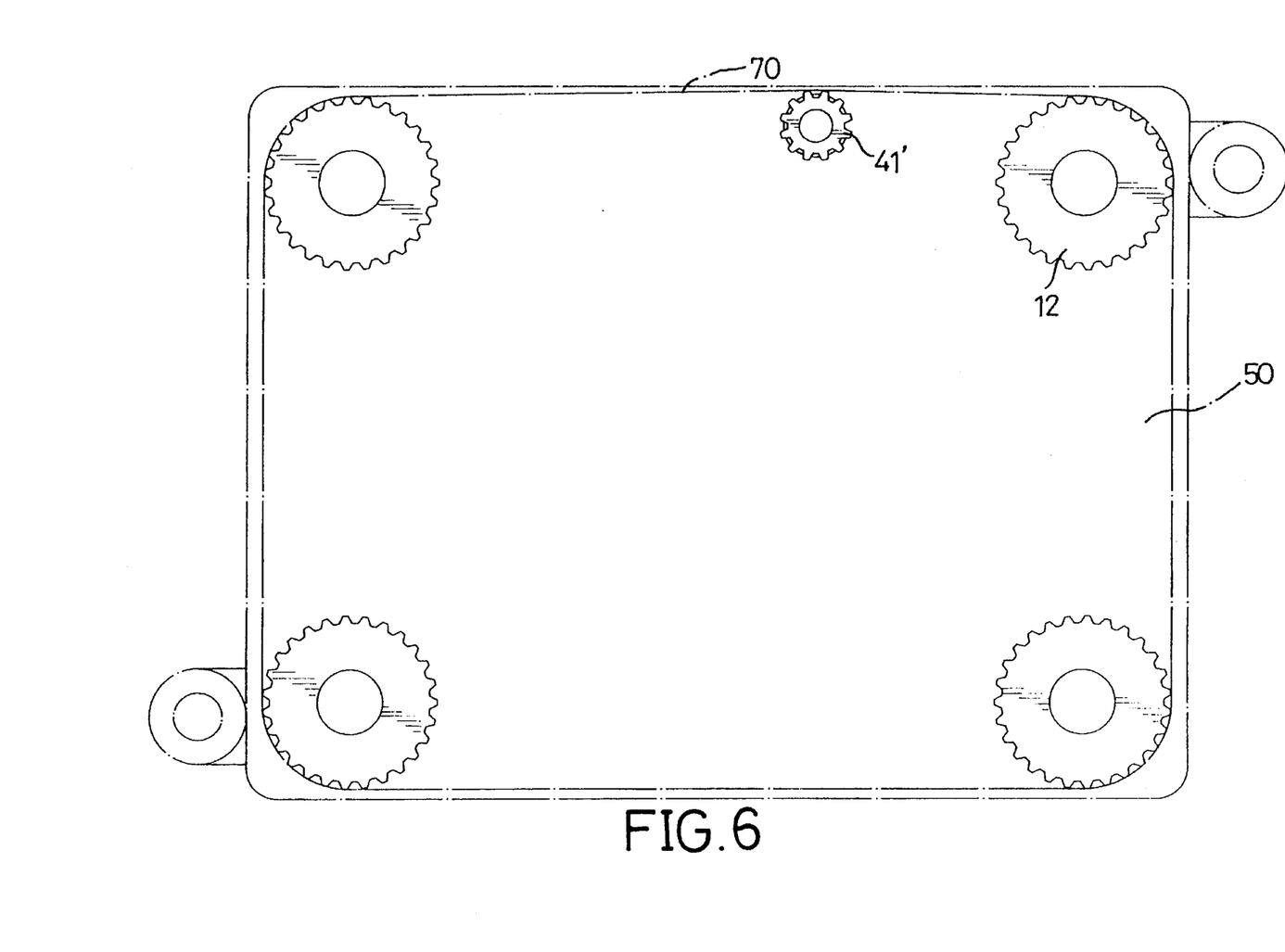
FIG. 6 is a plane view of an embodiment of the present invention wherein the gripping means is actuated by an endless chain.
Figure 7:
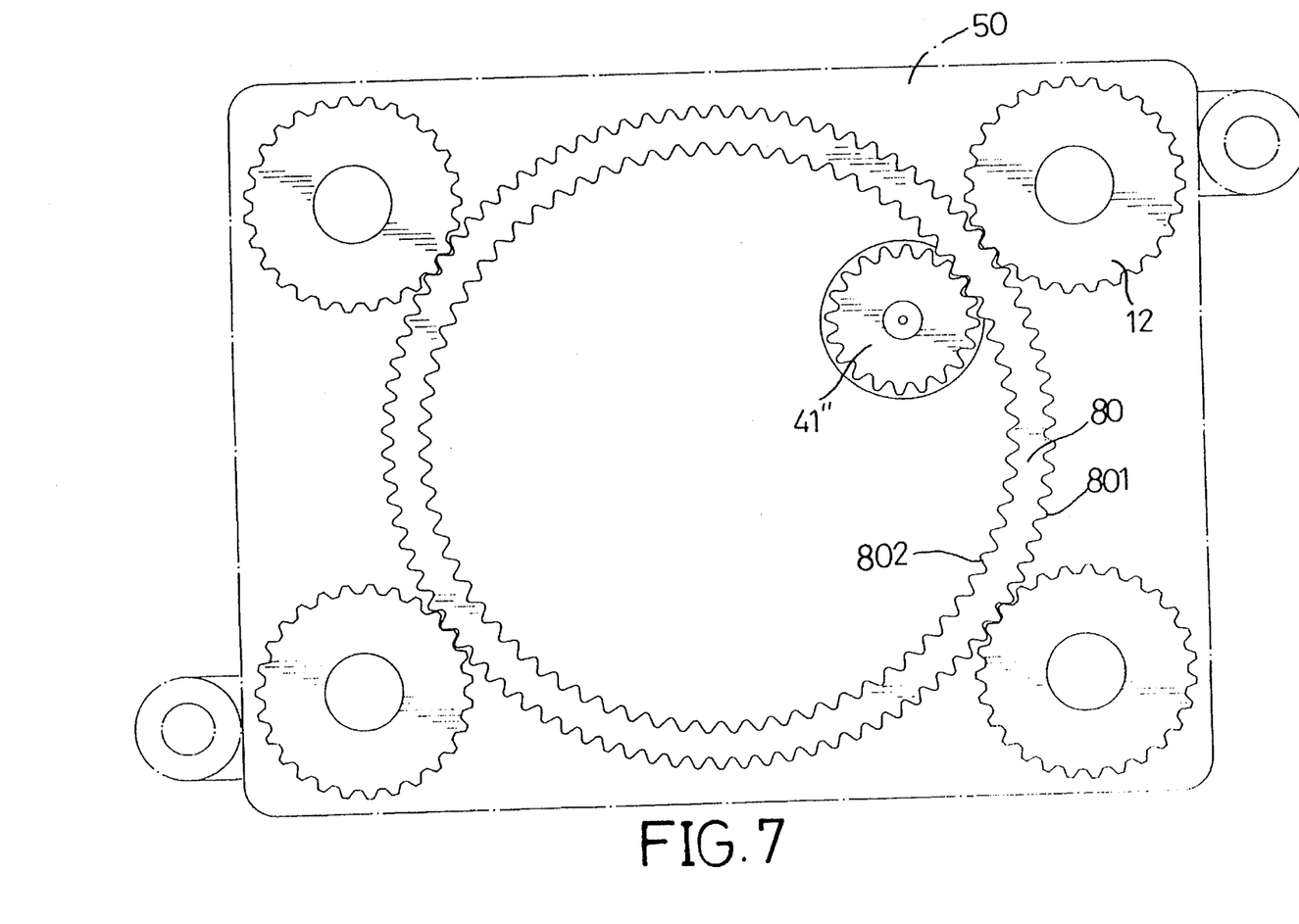
FIG. 7 is a plane view of yet another embodiment of the present invention wherein the four gripping means are actuated by a gear ring engaged thereto.

Referring now to FIG. 6 which is an embodiment of the present invention wherein an endless chain 70 is engaged to the four first gears 12 and the second gear 41' is engaged to the endless chain 70 to rotate the four first gears 12 simultaneously. FIG. 7 is yet another embodiment of the present invention wherein a gear ring 80 has an outer gear portion 801 engaged to the four first gears 12 and an inner gear portion 802 engaged to the second gear 41".

Although the invention has been explained in relation to its preferred embodiment, it is to be understood that many other possible modifications and variations can be made without departing from the spirit and scope of the invention as hereinafter claimed.

I claim:

1. A gripping means of an injection machine and comprising:

a rotatable means, said rotatable means rotatably disposed to a movable plate and including a board, said board having a front side and a rear side, said front side thereof having a wall disposed to each one of two opposite sides thereof and each wall having a key way defined in an inner side thereof, said rear side of said board having a first gear disposed thereto, an oval hole defined in said board between said two walls and a hole defined in said first gear and having a common axis with said oval hole;

said movable plate having a passage defined therein and said passage having an axis coinciding with said common axis of said hole and said oval hole, said plate having a T-shaped groove defined in a front side thereof facing to said first gear, at least one aperture defined in said movable plate and communicating with said T-shaped groove for a bolt extending through said aperture and engaged with a first hole defined in said first gear, a head of said bolt received in a section of said T-shaped groove, said movable plate having a mold fixedly engaged to a rear side thereof;

a first jaw having a first semi-circular threaded portion defined in an under side thereof and having a first key extending laterally from each one of two opposite sides thereof to be slidably received in said key way of said board, a first threaded hole defined in each said two opposite sides of said first jaw, a second jaw having a second semi-circular threaded portion defined in an upper side thereof and having a second key extending laterally from each one of two opposite sides thereof to be slidably received in said key way of said board, a second threaded hole defined in each said two opposite sides of said second jaw and in alignment with said first threaded hole, each said first threaded hole and said second threaded hole in alignment with each other having a threaded rod engaged therethrough, each said threaded rod having a tilt gear disposed to said bevel gear, a shaft extending through said oval hole, said hole and said passage, said shaft being fixed at both ends thereof and having a threaded portion defined in a peripheral surface thereof for engagement with said first semi-circular threaded portion and said second semi-circular threaded portions of said first jaw and said second jaw respectively;

a first motor disposed to said board beneath said oval hole and mechanically connected to said first bevel gear for engagement to said two tilt gears to control said first jaw and said second jaw to engage with said shaft;

a second motor disposed to said movable plate and having a second gear mechanically connected thereto and said second gear engaged to said first gear to rotate said board about said axis of said hole of said first gear so as to move said board and said plate along said shaft.

2. The gripping means as claimed in claim 1 wherein said plate has a first loop-like groove and a second loop-like groove defined in said front side thereof and having an axis coinciding with said axis of said passage, said first gear having a circular flange extending therefrom and toward said second loop-like groove for being received in said first loop-like groove and a washer being received in said first loop-like groove.

3. The gripping means as claimed in claim 1 wherein said first jaw and said second jaw respectively have a semi-circular flange extending therefrom and said two semi-circular flanges are respectively received in said oval hole.

* * * * *